Patented Oct. 23, 1923.

1,471,711

UNITED STATES PATENT OFFICE.

WERNER SIEBERT, OF LAUFENBURG, AARGAU, SWITZERLAND, ASSIGNOR TO NITRUM AKTIENGESELLSCHAFT, OF ZURICH, SWITZERLAND, A CORPORATION OF SWITZERLAND.

PROCESS FOR OBTAINING NITRITE FROM NITROUS FUMES PRODUCED IN ELECTRIC-ARC FURNACES.

No Drawing. Application filed May 13, 1922. Serial No. 560,729.

*To all whom it may concern:*

Be it known that I, WERNER SIEBERT, a citizen of the Republic of Germany, residing at Laufenburg, Aargau, Switzerland, have invented certain new and useful Improvements in a Process for Obtaining Nitrite from Nitrous Fumes Produced in Electric-Arc Furnaces, of which the following is a specification.

The present invention refers to the manufacture of technically pure nitrite by the action of diluted nitrous gases, especially as produced in electric arc furnaces, with soda or caustic soda solutions.

It is known that by this action a certain amount of nitrate is obtained besides the nitrite, which nitrate cannot be separated. For the special product in view this nitrate is useless and the nitrogen so bound is lost in the process.

To avoid this loss, it has already been proposed to cool the nitrous gases leaving the electric arc furnaces down to a temperature of not less than 300° centigrade, as at this temperature the gases have exactly the proper proportion of NO to $NO_2$, so that in bringing these gases into contact with the absorption liquid, nitrite only is the result. However, at the above mentioned temperature quite a considerable evaporation of the liquid takes place, which leads to the formation of nitric and nitrous acid, as steam and nitrous gases combine immediately to nitric acid.

For this reason a more or less considerable amount of nitric salts are also formed in this process, which renders it uneconomical for the manufacture of nitrite.

Now it has been found that technically pure nitrite of over 95% can be obtained under the following conditions:

The gases leaving the electric arc furnace are cooled down to a temperature of below 200° centigrade but not lower than 150° centigrade, whilst passing boilers to extract the heat and to use it for generating steam or other useful purpose or other heat extracting devices. The apparatus must however be designed in such a manner that the gases find neither place nor time enough to change into $NO_2$. This gas mixture, in which according to analyses considerably less than one half of the nitrous gases is $NO_2$, is led into the absorption apparatus at a temperature of between 150° and 200° centigrade. The absorption liquid itself is kept at a temperature of below 40° centigrade in all parts of the absorption system. It is however necessary to design the apparatus so that the gases are abruptly cooled down when coming into contact with the absorption liquid and that no gas particles remain at a higher temperature, whereby the gases are prevented from being charged with water vapor and from forming nitrate.

This can be technically achieved in quite a simple manner by connecting the absorption towers in parallel in which case the velocity of the circulating gases is kept below five-tenths of a meter per second, instead of leading the gases through all the absorption towers in series and thus bringing these gases into contact with the liquid over a very long way, for instance up to 100 m.

The absorption towers are filled with a fine material having a very large surface per cubic meter of volume.

At the above mentioned low velocity it is possible to absorb all the heat contained in the gases at 150 to 200° C. immediately on contact with the cooled absorption liquid and thereby avoid the formation of steam, which had been formed in the first absorption tower in the hitherto known process of manufacture and which has been the cause of the formation of a considerable amount of nitric acid and nitric salts in the following towers.

In the process as carried on according to the invention a gas velocity of below five-tenths of a meter per second is employed which permits the absorption of all the heat contained in the gases and, the $NO_2$ contained in them being in quantity inferior to the amount of NO, all the oxides are absorbed to pure nitrite.

As the nitrite absorption takes place in a very short time under the above mentioned conditions and as the velocity of the gases is very small, a layer of filling material of a few meters in height is sufficient and it is only necessary to connect two absorption towers in series.

In the first tower about 80% of all nitrous gases are absorbed and nearly pure nitrite is formed, while in the second tower the remaining gases are practically completely absorbed and nitrite of about 90% is formed.

If the products obtained in both towers are mixed and then concentrated, a nitrite in form of a salt containing over 95% nitrite-nitrogen is obtained.

If carbonate of soda is employed—of which only a 10% solution is possible—the result is the same provided the solution obtained in the first circulation is recharged with soda and re-led to the absorption system.

This process can be carried on until a solution containing about 30 to 40% nitrite in weight is obtained, out of which the nitrite-salt can be gained by concentration at a small expense of heating-steam.

I claim:

1. A process for obtaining pure nitrite from nitrous fumes produced in electric arc furnaces, which consists in introducing the nitrous gases at a temperature of from 150° to 200° C. into the absorption system, and in keeping the absorption liquid at a temperature of below 40° C. in all parts of the system whereby the introduced gases are abruptly brought to the temperature of the liquid when coming in contact with the latter.

2. A process for obtaining pure nitrite from nitrous fumes produced in electric arc furnaces, which consists in introducing the nitrous gases at a temperature of from 150° to 200° C. into the absorption system, keeping the absorption liqiud at a temperature of below 40° C. in all parts of the system, and in maintaining a velocity of the circulating gases in the absorption system that is below five-tenths of a meter per second, so that the heat contained in the gases can immediately be absorbed by the absorption liquid and the gases abruptly brought to the temperature of the liquid when coming in contact with the latter.

In testimony whereof I affix my signature.

Dr. WERNER SIEBERT.